United States Patent
Hu

[15] 3,668,452
[45] June 6, 1972

[54] DYNAMOELECTRIC MACHINE WITH IMPROVED MAGNETIC FIELD CONSTRUCTION

[72] Inventor: Paul Y. Hu, Boulder, Colo.
[73] Assignee: International Business Machines Corporation, Armonk, N.Y.
[22] Filed: Apr. 5, 1971
[21] Appl. No.: 131,329

[52] U.S. Cl. .............................................. 310/266, 310/268
[51] Int. Cl. .......................................................... H02k 1/22
[58] Field of Search ............................... 310/154, 266, 268

[56] References Cited

UNITED STATES PATENTS

| | | | |
|---|---|---|---|
| 3,431,638 | 3/1969 | Burr | 310/268 X |
| 3,277,324 | 10/1966 | Beaudoin | 310/154 |
| 3,293,466 | 12/1966 | Henry-Baudot | 310/154 |
| 3,312,846 | 4/1967 | Henry-Baudot | 310/268 X |

FOREIGN PATENTS OR APPLICATIONS

| | | | |
|---|---|---|---|
| 661,039 | 4/1963 | Canada | 310/268 |

*Primary Examiner*—D. X. Sliney
*Attorney*—Hanifin & Jancin and Francis A. Sirr

[57] ABSTRACT

A direct current motor of the printed circuit armature type wherein the stator permanent magnets are physically dimensioned to immerse substantially the entire armature winding in the stationary magnetic flux field.

9 Claims, 6 Drawing Figures

PATENTED JUN 6 1972

DYNAMOELECTRIC MACHINE WITH IMPROVED MAGNETIC FIELD CONSTRUCTION

BACKGROUND AND SUMMARY OF THE INVENTION

The present invention relates to the field of electrical dynamoelectric machines of the rotary type, and to the magnetic structure thereof, particularly the permanent magnet structure thereof.

Dynamoelectric machines provide mechanical motion by virtue of the interaction between a stator magnetic field and a rotor magnetic field. The rotor consists of a plurality of electrical conductors whose current flow direction is controlled, as by commutation, so that each conductor produces a small component of force, the summation of these components resulting in mechanical force and motion.

Prior art rotor windings of the wave and lap type utilize individual conductors which interconnect to form the rotor or armature winding. Each individual conductor consists of an active or force producing portion and other portions, called crossover portions, which do not produce force and are used only for the purpose of electrically connecting one conductor to another conductor. The active or force producing portion of an individual conductor is always immersed in the stator magnetic field, and always extends in a direction generally normal to the direction of motion. The crossover portions of an individual conductor are not colinear with the active portion, but rather they are inclined or bent away from the direction in which the active portion travels, and their only function is to travel in the direction of motion to advance the armature winding to the next active portion.

The teachings of the prior art suggest that the stator should be constructed and arranged so as to produce a magnetic field pattern which will immerse only the active portion of each conductor in the working air gap of the magnetic field, for it is only in this air gap that the conductors are carrying electrical current in a direction, relative to the stator magnetic flux field, so as to produce the desired motion producing force. With this prior art construction, the crossover portions detract from the efficiency of the machine in that they increase the rotor inertia and increase the total resistance of the armature winding, but they do not contribute to the total mechanical force.

The prior art utilizes magnets whose physical dimensions are approximately equal to the active portion of the conductor, to form a working air gap only at this active portion. As an alternative, the prior art also utilizes magnets whose physical dimensions are larger than the active portion of the conductor, with soft iron pole pieces being provided to focus the magnetic flux to again form a working air gap only in the area of the active portion of the conductors.

The term working air gap is to be distinguished from a leakage type air gap, the distinction being that the magnetic flux density in the working air gap is much larger, for example 5 or 10 times greater than the flux density in a non-working or leakage air gap, and provides useful torque.

The prior art teachings suggest that it is desirable to design a high torque - low inertia motor whose armature has a high active portion to crossover portion ratio. Such a tubular armature would have a small diameter and a long axial length. This results in a motor which requires long and expensive magnets. The resulting motor also has the disadvantage that the mechanical resonance of the armature is low.

The present invention increases the efficiency of dynamoelectric machines, for example, high torque - low inertia printed circuit direct current motors, by providing stator magnetic poles, such as permanent magnets, which place substantially all portions of the conductor in the working air gap of the stator magnetic field.

More specifically, the present invention is utilized, for example, in a printed circuit tubular armature motor. Considering a prior art motor of this type, it has been found that substantially the same motor torque can be achieved by utilizing the teachings of the present invention to reduce the axial length of the armature, so that substantially the entire armature winding is immersed in a working relationship with the stator magnetic field. The mass of this armature, and thereby its inertia, is now reduced. Also, the total winding length, and thereby its total resistance is reduced. This reduction in armature inertia and winding resistance is achieved with no loss in motor torque.

The principal advantages of such a structure include low power dissipation due to lower winding resistance and lower armature inertia; substantially higher mechanical resonance frequency due to a shorter armature, and if desired, a larger diameter armature; a reduction in physical size and thereby cost of the motor; and an increase in the torque to inertia ratio of the motor, this latter factor being a measure of the response time of the motor, or the ability of the motor to accelerate.

Printed circuit motors are of two general types, disk and tubular. In the disk type, the armature is a flat planar disk having radially extending colinear conductor portions and other non-colinear conductor portions which extend both radially and circumferentially. In accordance with the present invention, a stator radial magnetic field is established to immerse the entire conductor, both the colinear portion and the non-colinear portion, in the working air gap of the stationary magnetic field.

In the tubular motor, the hollow cylinder or tube armature includes axially extending colinear conductor portions and other non-colinear conductor portions which extend both axially and circumferentially. In accordance with the present invention, a stator axial magnetic field is established to immerse the entire conductor, both the colinear portion and the non-colinear portion, in the working air gap of the stationary magnetic field.

The foregoing and other features and advantages of the invention will be apparent from the following more particular description of the preferred embodiments of the invention, as illustrated in the accompanying drawings.

DESCRIPTION OF THE PREFERRED EMBODIMENTS

Figure 1:
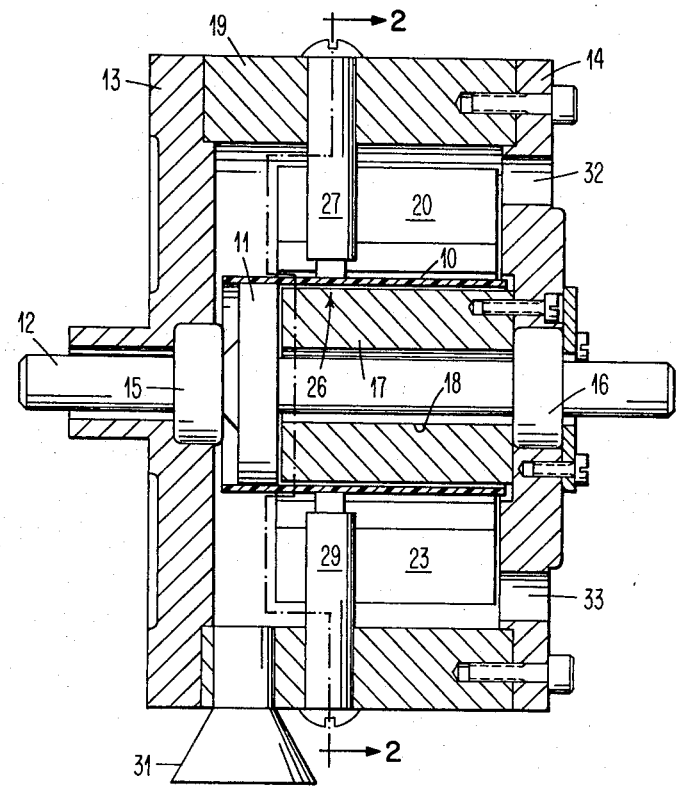
FIG. 1 is a side section view of a permanent magnet, printed circuit tubular armature, direct current rotary motor embodying the present invention.

FIG. 1 is a side section view of a permanent magnet direct current motor of the high torque - low inertia type, utilizing a printed circuit tubular armature 10. This armature is supported for rotation at one end by means of a phenolic glass filled cup 11 which is rigidly fixed to metallic output shaft 12. Shaft 12 is supported in aluminum end plates 13 and 14 by bearings 15 and 16. End plate 14 supports a magnetic flux return path member 17 in cantilever fashion, this member including a central bore 18 through which shaft 12 freely passes.

An annular shell 19, formed of magnetic material, is supported between end plates 13 and 14. This shell supports four 90°-spaced axially extending permanent magnets 20, 21, 22 and 23, for example, ALNICO 5–7 magnets. In the side view of FIG. 1, the axial dimension of magnets 20 and 23 can be seen, this axial dimension being substantially equal to the total axial length of tubular armature 10. Thus, substantially the total axial length of armature 10 is placed in a working air gap.

It will be noted that magnets 20–23 do not extend to the left into the region of the armature which is supported by cup 11. This cup is necessary to physically support the armature, and the presence of the cup prevents the extension of member 17 into magnetic cooperative relation with this portion of the armature. In the particular armature disclosed, cup 11 physically cooperates with a portion of the left-hand crossover portion of the armature winding, and thus this crossover portion is not immersed in the stator magnetic field. However, within the teachings of this invention, the armature can be constructed so that its winding does not extend axially into the region of cup 11, and thus the entire winding is immersed in the magnetic field.

It is recognized that the spirit of the present invention is met by immersing less than the entire winding in the stator magnetic field. Thus, the term "substantial portion" is used to define these alternate structures which utilize the present invention by means of an armature construction which relies upon at least a portion of the non-colinear, or crossover, region to generate a rotational force component.

Figure 2:
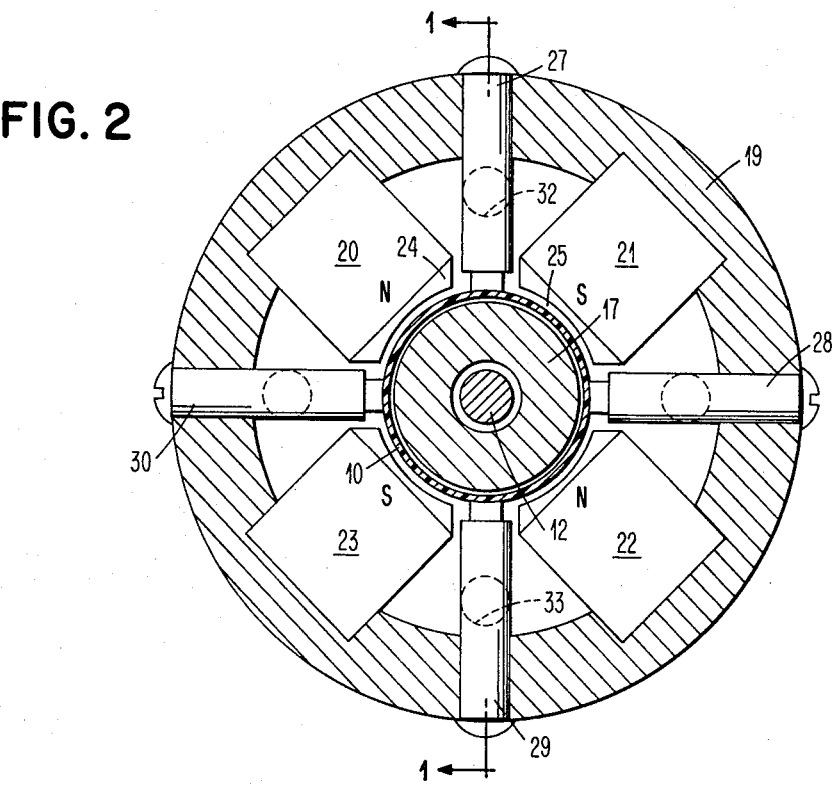
FIG. 2 is a section view of the motor of FIG. 1 taken along the line 2—2.

In FIG. 2 the circumferential spacing of magnets 2–23 relative to number 17 can be seen. This figure also discloses the circumferentially alternating magnetic polarity of the permanent magnets as well as the flux focusing soft iron pole faces 24 associated with each of the magnets. FIG. 2 also discloses the tubular working air gap 25 which is defined by the permanent magnets, their pole pieces and flux return member 17. Tubular armature 10 is positioned for rotation within this working air gap and freely rotates therein.

The commutator portion of armature 10 consists of an annular band of axially extending conductors in the general area identified by reference numeral 26. Four 90°-spaced brushes are circumferentially spaced about armature 10 and are mechanically supported by member 19. In FIG. 2 four brush holders 27, 28, 29 and 30 are shown positioned between the permanent magnets, brush holders 27 and 29 also being shown in the side view of FIG. 1. Brush pairs 27–28 and 29–30 are redundant pairs since only one 90°-spaced pair of brushes is necessary to achieve commutation. Four brushes, or two pairs of brushes, are used for mechanical contact stability. Also, these brushes can be physically positioned in alignment with magnets 20–23 so as to electrically contact a crossover portion of winding, such as that portion overlying cup 11.

The motor of FIG. 1 is cooled by supplying air under pressure to air inlet 31. Cooling air enters the commutator end of the motor, passes axially down the motor and exits the motor at four air outlets, two of which are seen in FIG. 1 and identified by reference numerals 32 and 33.

The essence of the present invention resides in the structural relationship of the magnetic field producing means and the armature winding configuration which carries electrical current to produce the dynamoelectric effect. FIGS. 1 and 2 disclose the axial and the circumferential arrangement of the magnetic field means 20–23 relative to armature 10.

Figure 3:
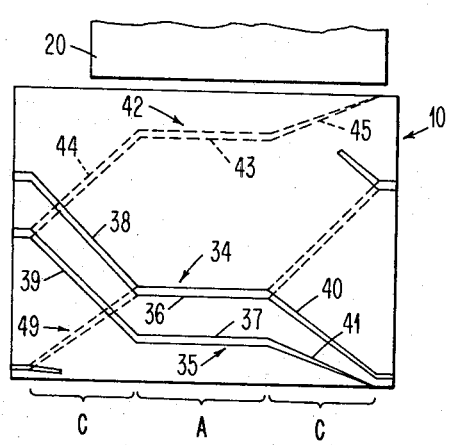
FIG. 3 is a side view of the tubular armature of FIG. 1, showing representative conductors of a wave type winding.

FIG. 3 is a side view of tubular armature 10 and shows representative conductors of a printed circuit wave type winding, although the invention is equally applicable to a lap type winding. Armature 10 may be constructed of a tubular insulating support member, such as an epoxy/fiber glass tube, upon which a plurality of conductors are formed by printed circuit techniques. The term "printed circuit techniques" is meant to include any method by which electrical conductor current paths are held by the support member. For example, these conductors may be placed on both the inside and the outside tubular surface of the support member, or may consist of an outer and an inner layer of copper conductors with insulation in between the conductors.

Referring to FIG. 3, the outer conductors are defined by solid lines and the inner conductors are defined by broken lines. Thus, reference numerals 34 and 35 identify two individual conductors disposed on the outside surface of the tubular armature. Each of these conductors includes a central colinear portion 36 and 37 which extends generally parallel to the axis of rotation of the armature. At each end of the colinear portion of a conductor, the conductor bends to continue in a non-colinear fashion, both in an axial direction and in a circumferential direction, so as to advance the winding about the armature. These end portions of conductors 34 and 35 are called crossover portions, and they are identified by reference numerals 38, 39, 40 and 41.

Reference numeral 42 identifies an inner conductor which is disposed in the second tubular conductor layer of the armature and likewise includes a colinear axially extending central portion 43 and crossover non-colinear portions 44 and 45.

Conductors 34, 35 and 42 can be characterized as having axially extended colinear portions which lie in a cylindrical plane and end crossover portions which are inclined, or non-colinear, to the colinear portions and lie in an extension of the cylindrical plane.

All winding conductors can be divided into two portions. The first portion is identified by the letter A of FIG. 3 and has been called "colinear" in that the conductor extends in a straight line and in a direction which is normal to the direction of motion of the armature. The second portion is identified by the letter C of FIG. 3 and has been called "non-colinear" in that the conductor in this portion is not an extension of the conductor in colinear region A. The present invention makes use of the fact that non-colinear regions C can be resolved into two components, one of which is in fact colinear. Thus, crossover conductor 40 can be resolved into a component which is colinear with conductor 36 and can be used to generate a useful force, and a second 90°-shifted component which extends in the direction of motion and can be visualized as physically advancing the winding about the circumference of the armature.

For the purpose of describing the present invention, a ratio A/2C will be defined as the colinearity ratio of armature 10. As has been mentioned, the practice of the present invention results in no loss of motor torque when the axial length of the tubular armature is reduced, while maintaining the same diameter for the armature. Since the diameter is not changed, the physical dimension C does not change. However, a reduction in axial length reduces the physical dimension A. Thus, the colinearity ratio is reduced. While the present invention is not limited thereto, it has been found that the present invention has its greatest utility for machines whose armatures have a colinearity ratio which is equal to or less than one.

Assuming that electrical current is flowing from right to left in conductor 35, this current first enters crossover portion 41, flows down the central portion 37, and enters crossover portion 39. At this point the electrical current passes to the second conductor layer of the tubular armature and returns left to right in conductor 42. Conductors 37 and 43 are circumferentially spaced related to the permanent magnet structure of the motor such that these conductors are under the influence of opposite polarity magnetic poles. Thus, conductor 37 may be associated with a south pole and conductor 43 may be associated with a north pole. Therefore, each of these conductors contribute like rotational force to the armature. The circumferential spacing of conductors 37 and 43 is established by the relationship 360°/N, where N is the number of magnetic poles.

Also, as shown in FIG. 3, immediately radially displaced from conductor 34, on the inner conductor layer of the tubular armature, is an inner conductor which likewise carries current from right to left. To simplify the disclosure of FIG. 3, the majority of the inner and outer conductors is not disclosed. However, a plurality of conductors, both inner and outer, are associated with each of the four magnetic poles of the motor of FIG. 1 to produce rotational force causing the armature and the shaft to rotate.

Brushes 27–30 are conventionally constructed to span and make electrical contact to a number of adjacent armature conductors. The conductors which are at any given time associated with the brushes are in fact shorted and do not carry current, with the exception of two conductors associated with each brush.

Figure 4:
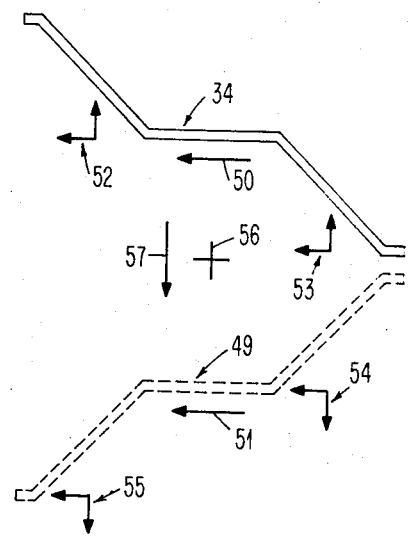
FIG. 4 is a diagrammatic view of an individual outer conductor and a radially adjacent inner conductor of the armature of FIG. 3, relating current flow direction to magnetic field direction to facilitate an understanding of the present invention.

In FIG. 4 the single outer conductor 34 is shown laterally displaced from inner conductor 49. This conductor in reality is located radially adjacent conductor 34 and not displaced therefrom. It will be remembered that conductors 34 and 49 both carry current from right to left, as represented by arrows 50 and 51. In the crossover portions of these conductors, the currents 50 and 51 can be resolved into two 90° vectors, as represented by vector groups 52, 53, 54 and 55. Each of these vector groups consists of an axially extending colinear vector which represents a component of current in the crossover sections which flows from right to left. The other vector component of the two vector groups 52 and 53 extends in a circumferential clockwise direction (as viewed from the right-hand end of the armature of FIG. 3), whereas the similar vector component of the two vector groups 54 and 55 extends circumferentially in a counterclockwise direction.

Conductors 34 and 49 may, for example, be associated with a south magnetic polarity pole. This polarity is represented by the tail 56 of an arrow extending into the diagram of FIG. 4.

Within the teachings of the prior art, only the current components represented by arrows 50 and 51 are subjected to the magnetic field represented by arrow 56 to produce a force component represented by arrow 57. The structure of the present invention immerses a substantial portion of the crossover portions of conductors 34 and 49 in magnetic field 56 and thus an additional force component results from the left to right colinear extending vectors of the vector couples 52–55.

The clockwise extending components of the vector couples 52 and 53 are effective to produce an axial force on the armature which tends to move the armature toward the left. However, this axial force is cancelled by the counter-clockwise component of vector couples 54 and 55 which cooperate with the magnetic field 56 to produce an axial force tending to move the armature to the right. Thus, the structure of the present invention increases the efficiency of the motor by increasing the magnitude of the force vector 57, without the detrimental effect of producing axial loading of the armature against its bearings.

The above description has dealt exclusively with a winding having a physical portion which was identified as colinear, and another portion identified as non-colinear. From this, the colinearity ratio A/2C was defined, and it was recognized that the utility of the present invention increases as this ratio decreases. A well-known winding, called a skew winding, has a linearity ratio of zero, and while such a winding is not disclosed, the present invention contemplates the use of such a winding. Skew wound armatures are particularly useful in situations where the armature length of a tubular armature is limited to the dimension $2\pi r/N$ where r is the radius of the tubular armature and N is the number of poles.

Figure 5:
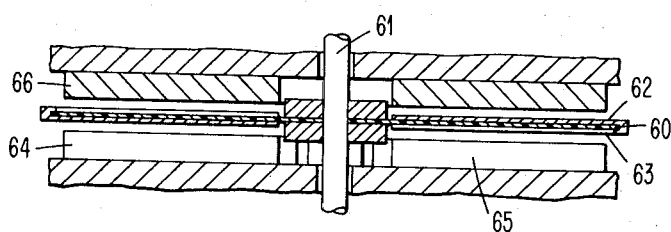
FIG. 5 is a side section view of a portion of a permanent magnet, printed circuit disk armature, direct current rotary motor embodying the present invention.

The teachings of the present invention also find utility in the annular or flat air gap type dynamoelectric machine. FIG. 5 is a side section view of a portion of a permanent magnet printed circuit disk armature direct current rotary motor embodying the present invention. Reference numeral 60 identifies a disk armature which is supported by centrally disposed shaft 61. Shaft 61 is supported for rotation by bearings, not shown. Armature 60 carries an annular pattern of conductors 62 on the upper side of a disk of electrical insulating material, and a second annular pattern of conductors 63 on the bottom side of the disk. An even number of permanent magnets 64 and 65 are radially disposed about the armature, on one side thereof. The upper face of the magnets alternate in magnetic polarity about the circumference of the armature. A magnetic return path member in the form of donut-shaped annular member 66 is positioned on the other side of the armature from the magnets.

Figure 6:
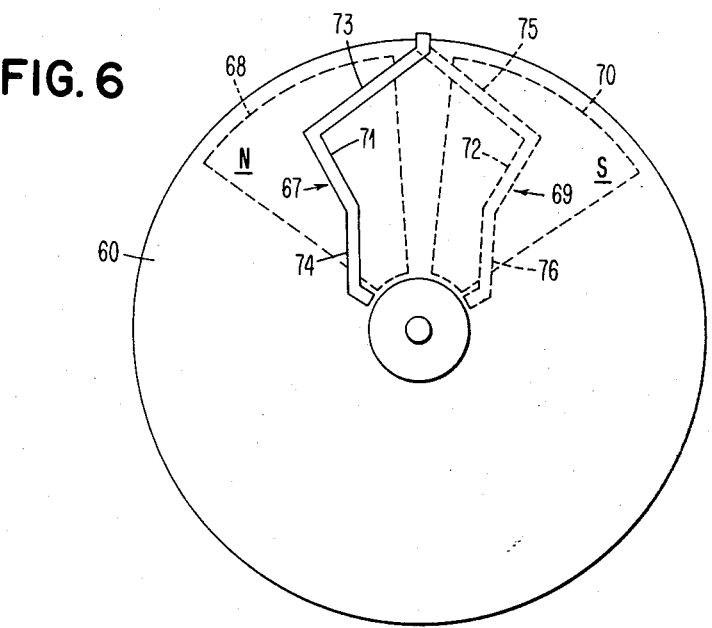
FIG. 6 is a top view of the disk armature of FIG. 5, showing representative winding conductors in relation to a permanent magnet field structure in accordance with the present invention.

FIG. 6 is a top view of armature 60 and discloses one of the many upper conductors 67, disposed in operative relation to the north pole of a magnet 68. On the opposite side of armature 60 is a conductor 69 which cooperates with the south pole of a magnet 70. Here again, armature 60, and the winding patterns 62 and 63, include a large number of individual conductors. However, for simplicity, only one conductor 67 of pattern 62 is disclosed and only one conductor 69 of pattern 63 is disclosed. As with the conductors of the tubular armature disclosed in FIG. 3, the individual conductors of the disk armature of FIG. 6 include radially extending central and generally colinear portions 71 and 72 which terminate in crossover and non-colinear portions 73, 74, 75 and 76. Prior art structures provide magnetic field means constructed and arranged to immerse only portions 71 and 72 of these conductors in a magnetic field to produce a working force causing rotation of armature 60. Within the teachings of the present invention the magnetic means 68, 70 extend in a radial direction to immerse substantially the complete conductors 67 and 69 in the working air gap of a magnetic field. The current flow of these conductors can be analyzed, as was done in connection with FIG. 4, to disclose that motor efficiency is improved by the structure of the present invention.

Conductors 67 and 69 can be characterized as having radially extending colinear portions which lie in a flat plane and end crossover portions which are inclined, or non-colinear, to the colinear portions and lie in an extension of the flat plane.

The discussion relative to colinearity ratio, as related to a tubular armature, also pertains to the disk armature in that the lower the ratio, the greater the advantage to be achieved by immersing the entire winding in the working air gap of the stator magnetic field.

The conductors of FIG. 6 may be formed by printed circuit techniques, this term including within its meaning a number of manufacturing processes, for example the forming of conductors 67 and 69 by first stamping these conductors out of a sheet of metal and then attaching them to a disk of electrical insulating material and welding the end connections.

As with the tubular armature, the disk armature may contain a skew winding wherein the colinearity ratio is zero.

The above description has disclosed embodiments of the present invention wherein one and one-half crossover portions of a tubular armature and both crossover portions of a disk armature are immersed in the working air gap of the stationary magnetic field. It is recognized that the spirit of the present invention is met by immersing the entire crossover portion, or less than an entire crossover portion, in the stationary magnetic field. Thus, the term "substantial portion" is used to define these alternate structures which, while differing in detail from the structures above described, do in fact utilize the present invention.

While the invention has been particularly shown and described with reference to preferred embodiments thereof, it will be understood by those skilled in the art that various changes in form and details may be made therein without departing from the spirit and scope of the invention.

What is claimed is:

1. In a dynamoelectric machine of the type having an armature including a winding formed of a plurality of interconnected conductors, each conductor including a central colinear portion which lies in a plane, and two end crossover non-colinear portions which are inclined to the colinear portion, one at each end thereof, and lie in an extension of said plane, said crossover portions serving the purpose of advancing the armature winding, the improvements comprising;

a magnetic field structure associated with said armature winding, said field structure including a plurality of permanent magnets and a magnetic flux return path, said magnets and said return path being uniformly spaced and coextensive to define a working magnetic field gap by such coextension to immerse a substantial portion of the entire winding, including crossover portions, in said working magnetic field gap.

2. An electric machine as defined in claim 1 wherein said armature has a colinearity ratio which is equal to or less than one.

3. An electric machine as defined in claim 1 wherein said armature is a tubular armature whose tubular shape defines a tubular plane, and wherein said plurality of magnets and flux return path coextensively extend through a substantial portion of the entire axial length of said armature.

4. An electric machine as defined in claim 1 wherein said armature is a disk armature whose flat shape defines said plane, and wherein said plurality of magnets and flux return path coextensively extend through a substantial portion of the entire radial dimension of said armature.

5. An electric machine as defined in claim 3 wherein said tubular armature includes a plurality of individual conductors, each individual conductor having a colinear central portion which extends generally parallel to the axis of said armature, and end crossover non-colinear portions which extend axially and circumferentially to advance the winding about the tube; wherein said plurality of magnets extend axially and are supported relative to said armature to produce circumferentially alternating magnetic poles on one side of said tube, the axial length of said magnets being substantially equal to the length of said armature; and wherein said flux return path is supported relative to said armature and extends axially coextensive with said magnets to define a tubular working air gap for said armature.

6. An electric machine as defined in claim 5 wherein said tubular armature includes an insulating support member and a printed circuit winding.

7. An electric machine as defined in claim 6 wherein said tubular armature has a colinearity ratio which is equal to or less than one.

8. An electric machine as defined in claim 4 wherein said disk armature includes a plurality of individual conductors, each conductor having a central linear portion which extends generally radial to the axis of rotation of said disk, and end crossover non-colinear portions which extend radially and circumferentially to advance the winding about the disk; wherein said permanent magnets are a plurality of radially extending permanent magnets which are supported relative to said armature to produce circumferentially alternating magnetic poles on one side of said disk, the radial length of said magnets being substantially equal to the radial length of an individual conductor of said armature winding; and wherein said flux return path is supported relative to said armature and extends coextensive with said magnets to define a flat uniform working air gap for said armature.

9. An electric machine as defined in claim 9 wherein said disk armature includes an insulating support member and a printed circuit winding.

* * * * *

PO-1050
(5/69)

UNITED STATES PATENT OFFICE
CERTIFICATE OF CORRECTION

Patent No. 3,668,452          Dated  June 6, 1972

Inventor(s) Paul Y. Hu

It is certified that error appears in the above-identified patent and that said Letters Patent are hereby corrected as shown below:

Column 3, line 24, "2-23" should read --20-23--.

Column 8, line 22, "claim 9" should read --claim 8--.

Signed and sealed this 29th day of August 1972.

(SEAL)
Attest:

EDWARD M.FLETCHER,JR.                ROBERT GOTTSCHALK
Attesting Officer                    Commissioner of Patents